June 20, 1961 J. M. CARROLL 2,989,745
FM TRANSISTOR TRANSCEIVER
Filed Aug. 25, 1958
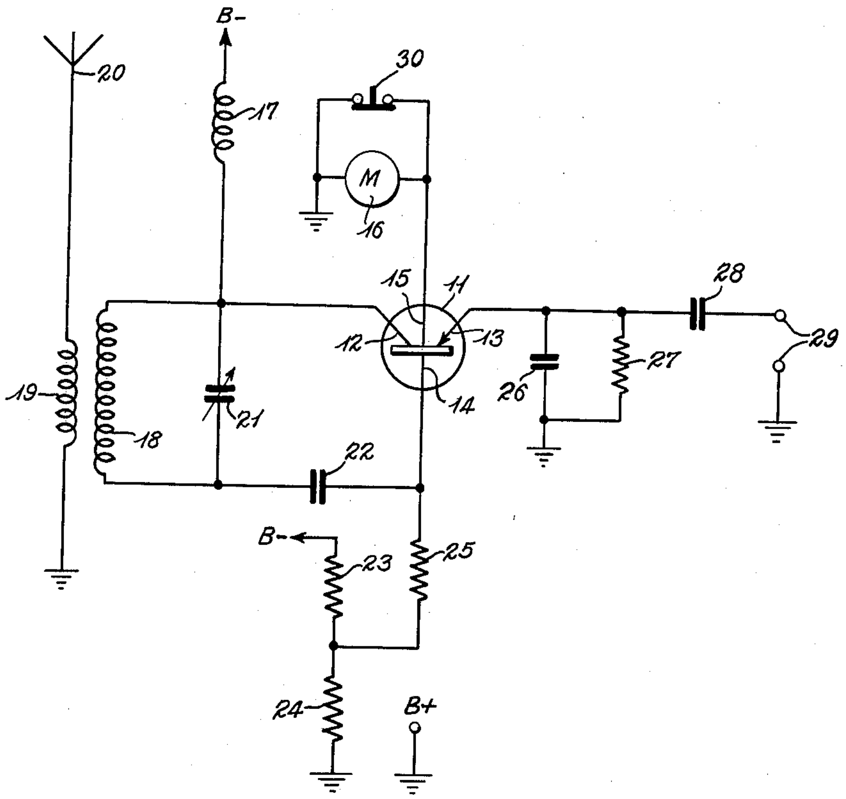
INVENTOR
James M. Carroll
BY Stevens, Davis, Miller & Mosher
ATTORNEYS 2,989,745
Patented June 20, 1961

2,989,745

FM TRANSISTOR TRANSCEIVER

James M. Carroll, Dallas, Tex., assignor to Texas Instruments Incorporated, Dallas, Tex., a corporation of Delaware Filed Aug. 25, 1958, Ser. No. 756,910
4 Claims. (Cl. 343—181)

The present invention relates to an FM transceiver circuit which requires only one transistor as an active component.

A transceiver is defined as a circuit which will both transmit and receive. The transceiver circuits of the prior art are relatively complex and use a plurality of vacuum tubes. Vacuum tubes require a large power supply to heat the cathode and the more vacuum tubes that are used, the larger the power supply must be. As a result, the transceivers of the prior art were heavy, cumbersome, and expensive.

In order to avoid the problems heretofore encountered, a novel transceiver is provided by the present invention which requires one tetrode transistor only. This transistor acts both as the only active element of an FM transmitter and as the active element of an FM detector. Therefore, the transceiver of the present invention requires very little power, can be enclosed in a very small space, has very little weight, and is relatively inexpensive. In fact, the present invention practically makes the so called two way wrist radio a reality.

Briefly, the circuit of the invention comprises a tetrode transistor having two base electrodes, a collector electrode, and an emitter electrode. When operated as a transmitter, the signal produced at the collector is fed back regeneratively between the emitter electrode and one of the base electrodes to cause the circuit to oscillate. The signal from a microphone is applied to the other base electrode. The signal applied from the microphone will change the frequency of the oscillation in accordance with the amplitude of the signal. Thus, the signal generated by the oscillator will be frequency modulated. When the circuit is operated as an FM receiver the circuit is tuned to be on the threshhold of oscillating. The frequency of the signal, which the circuit is on the threshhold of generating is near the carrier frequency of the received FM signal. For convenience, this frequency, which the circuit is on the threshhold of generating, shall be referred to as the threshhold frequency. Because the carrier frequency of the received FM signal is near the threshhold frequency of the circuit, the received FM signal will regenerate itself. As the modulation of the received FM signal causes the frequency of the received signal to approach the threshhold frequency, the regeneration will become greater, and as a result, the signal developed by the circuit will have a greater amplitude. As the frequency of the received FM signal recedes from the threshhold frequency, the regeneration will become less, and as a result, the signal developed by the circuit will have a smaller amplitude. Thus, the circuit develops a signal whose amplitude varies in accordance with the frequency of the received signal, or in other words, an AM signal. This AM signal is demodulated by the emitter circuit of the tetrode and the RF of the demodulated signal is filtered out. Thus, the audio signal is obtained.

Additional objects and advantages of the invention will become readily apparent as the following description of a preferred embodiment of the invention unfolds and when taken in conjunction with the single figure of the drawing which illustrates a circuit diagram of the invention.

As shown in the figure, the transceiver circuit employs a junction tetrode transistor 11 having two base electrodes 14 and 15, a collector 12, and an emitter 13. The tetrode is of the type disclosed on pages 139 through 145 of Transistors Hand Book by W. D. Beritt, published by Prentice-Hall in 1956. This description is hereby incorporated by reference. The minus side of a D.C. power supply is connected to the collector 12 over an inductor 17. The positive side of the power supply is connected to ground. The power supply polarities given are for a p-n-p transistor and would, of course, be reversed when an n-p-n tetrode transistor is used as transistor 11. A resistor 27 connects the emitter 13 to ground. The collector 12 is connected to the base electrode 14 through the series circuit of one winding 18 of an air core transformer and a capacitor 22. A variable capacitor 21 is shunted across the transformer winding 18 to form a tank circuit therewith. The other winding 19 of the air core transformer is connected between an antenna 20 and ground. Resistors 23 and 24 are connected in series between the negative side of the power supply and ground to form a voltage divider. The junction of resistors 24 and 23 is connected to the base electrode 14 through the resistor 25 to provide bias to the base electrode 14. The emitter 13 of the transistor 11 is connected to one of a pair of output terminals 29 through a capacitor 28. The other output terminal is connected to ground. The emitter 13 is also connected to ground over an RF bypass capacitor 26. A microphone 16 is connected between the base electrode 15 and ground to provide the audio modulation signal when the device is used as a transmitter. A "press-to-talk" switch 30 shunts the microphone 16 and connects base electrode 15 directly to ground when the device is operated as a receiver.

When the device is operated as a transmitter, switch 30 is opened to put the microphone in the circuit and the variable capacitor 21 is tuned until the circuit oscillates, with the winding 18 and the capacitor 21 forming a tank circuit for the oscillation. The signal applied to the electrode 15 from the microphone 16 will vary the effect of the base electrode 14 on the conductivity of the transistor 11. As the effect of the electrode 14 is increased or decreased, the frequency of oscillation of the oscillator circuit will change in accordance therewith, thus, the oscillator will produce a signal frequency modulated by the audio signal applied to the electrode 15 from the microphone 16. This FM signal is induced in the winding 19 of the air core transformer and is then transmitted from the antenna 20.

When the circuit is to be operated as the receiver, switch 30 is released (closed) removing the microphone 16 from the circuit. This change in resistance from the base 15 to ground causes the circuit to drop out of oscillation because of the change in loading on the tank circuit. The tank circuit remains tuned to the transmitter frequency which now becomes the carrier frequency of the FM signal to be received. Although the circuit will not oscillate and thus is not regenerative at the tank circuit frequency when switch 30 is closed, it is regenerative at a frequency slightly different from the resonant frequency of the tank circuit. This frequency at which the circuit is regenerative with switch 30 closed will be referred to as the threshhold frequency. Thus, an unmodulated carrier signal at the resonant frequency of the tank circuit when induced therein by the antenna 20 will not produce oscillation or regeneration in the circuit. However, when such a carrier signal is frequency modulated, its frequency approaches and recedes from the threshhold frequency as a function of the modulation signal and the circuit becomes more or less regenerative also as a function of the modulation signal. For example, as the received signal approaches the threshhold frequency, the regeneration will be greater, and as the signal recedes from the threshhold frequency, the regeneration will be less. The bias applied to the base of the transistor 11 from the resistor 25 is selected so that half of the signal developed in the emitter circuit is cut off, or in other words, the transistor operates in the class B region. The amplitude of the signal applied to the emitter 13 will increase and decrease as the frequency of the received signal increases or decreases in regeneration, thus, the amplitude of the signal on the emitter 13 will depend upon the frequency of the received signal. The capacitor 26 filters out the RF portion of the signal on the emitter 13 and only the audio signal is passed through the capacitor 28 to the output terminal 29.

By way of a specific example of a working device, the circuit of the present invention has been operated successfully with the various components having values as follows:

| | |
|---|---|
| Tank circuit components 18 and 19 resonant at | 110 mc. |
| Capacitor 22 | 220 mmf. |
| Capacitor 26 | 100 mmf. |
| Capacitor 28 | .1 mf. |
| Resistor 23 | 4.7K |
| Resistor 24 | 2.7K |
| Resistor 25 | 10K |
| Resistor 27 | 1.5K |
| Coil 17 | 1 mh. |
| Power supply voltage | 7.5 v. |
| Transistor 11 experimental P-N-P germanium tetrode | TX-501 |

The above noted component values are by way of example only, and it is in no way intended that they be considered as limiting the present invention.

Thus, there is provided by this invention a single transistor circuit which will both transmit and receive FM signals.

The above description presents a preferred embodiment of the present invention. This preferred embodiment can be modified in many ways without departing from the spirit and scope of the invention which is to be limited only as defined in the appended claims.

What is claimed is:

1. A transceiver comprising a tetrode transistor having a first base electrode and a second base electrode, means for applying an audio signal to said first base electrode, circuit means including a tank circuit for connecting the collector of said transistor to said second base electrode, means to vary the tuning of said tank circuit, means to apply direct current power between the collector and emitter of said transistor and to apply direct current bias to said second base electrode, means to filter out the radio frequency from the signal on the emitter of said transistor, and means to selectively change the loading on said tank circuit between a first value at which oscillation occurs and a second value at which oscillation does not occur.

2. A transceiver comprising a tetrode transistor having two base electrodes, means connecting one of said base electrodes directly to circuit ground, means for disconnecting said one base electrode from circuit ground and applying an audio signal to said one base electrode, circuit means including a tank circuit connecting the collector of said transistor to the other one of said base electrodes, means to vary the tuning of said tank circuit, and means to apply direct current power between the collector and emitter of said transistor and to apply direct current bias to said other one of said base electrodes.

3. A transceiver comprising a tetrode transistor having two base electrodes, means connecting one of said base electrodes directly to circuit ground, means for disconnecting said one base electrode from circuit ground and applying an audio signal to said one base electrode, a transformer having a first winding and a second winding, a variable capacitor connected in shunt with said first winding, circuit means connecting the collector of said transistor to one terminal of said first winding, circuit means connecting the other terminal of said first winding to the other one of said base electrodes, an antenna, circuit means connecting said antenna to said second winding, means to apply direct current power between the collector and emitter of said transistor and to apply a direct current bias to said other one of said base electrodes.

4. A transceiver comprising a tetrode transistor having two base electrodes, an emitter electrode and a collector electrode, a tuned tank circuit interconnected between said collector electrode and one of said base electrodes, antenna means coupled to said tuned tank circuit, a source of operating and biasing potential connected to said transistor, an audio signal source connected to the other one of said base electrodes, radio frequency by-pass means and output load impedance means connected to said emitter electrode, and two-position switch means interconnected with said transistor, said switch means when in one of its two positions conditioning the transceiver for receiving by disabling said audio signal source and by rendering said transistor effective to produce an audio frequency signal which is developed across said load impedance means, said switch means when in the other of its two positions conditioning the transceiver for transmitting by enabling said audio signal source and by causing said transistor to produce in said antenna means electrical oscillatory signals frequency modulated with the output from said audio signal source.

References Cited in the file of this patent

UNITED STATES PATENTS

| | | |
|---|---|---|
| Re. 24,183 | Wallace | June 17, 1956 |
| 2,288,214 | Summers | June 30, 1942 |
| 2,366,329 | George | Jan. 2, 1945 |
| 2,851,592 | Webster | Sept. 9, 1958 |